(12) United States Patent
Lee et al.

(10) Patent No.: US 6,382,876 B2
(45) Date of Patent: May 7, 2002

(54) METHOD OF REPAIRING OR REINFORCING WORN-OUT UNDERGROUND BURRIED DRAINPIPES BY RESIN TRANSFER MOLDING PROCESS USING BOTH FLEXIBLE TUBES AND BAGGING FILMS

(75) Inventors: Dai Gil Lee, Taejon; Jae Wook Kwon, Seoul; Woo Seok Chin; Ae Kwon Yoo, both of Kyunggi-do, all of (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/761,825

(22) Filed: Jan. 18, 2001

(30) Foreign Application Priority Data

Jul. 22, 2000 (KR) .......................................... 2000-42253

(51) Int. Cl.[7] .............................. F16L 1/00; F16L 55/18
(52) U.S. Cl. .............................. 405/184.2; 405/154.1; 405/146; 405/184.1; 138/97; 138/98; 156/156; 156/295; 264/36.16; 264/257; 264/267; 264/314
(58) Field of Search ............................. 405/146, 150.1, 405/154.1, 184, 184.1, 184.5; 138/97, 98; 156/94, 156, 287, 294, 295; 264/257, 258, 267, 269, 313, 314, 516, 573, 36.16, 36.17, 36.22

(56) References Cited

U.S. PATENT DOCUMENTS

| | | | | |
|---|---|---|---|---|
| 4,350,548 A | * | 9/1982 | Zenbayashi et al. | 156/287 X |
| 4,714,095 A | * | 12/1987 | Muller et al. | 138/98 |
| 4,972,880 A | * | 11/1990 | Strand | 138/98 |
| 5,077,107 A | * | 12/1991 | Kaneda et al. | 138/98 X |
| 5,411,060 A | * | 5/1995 | Chandler | 138/98 |
| 5,423,630 A | * | 6/1995 | Imoto et al. | 405/184.2 |
| 5,501,248 A | * | 3/1996 | Kiest, Jr. | 138/98 |
| 5,530,695 A | * | 6/1996 | Imoto et al. | 156/287 X |
| 5,672,227 A | * | 9/1997 | Chiu | 156/295 |
| 5,803,666 A | * | 9/1998 | Keller | 405/154 X |
| 5,807,025 A | * | 9/1998 | Sundermann | 138/98 X |
| 5,857,494 A | * | 1/1999 | Tsukamoto et al. | 138/98 X |
| 5,868,169 A | * | 2/1999 | Catallo | 138/98 |
| 5,915,886 A | * | 6/1999 | McNeil | 405/303 |
| 5,925,409 A | | 7/1999 | Nava | |
| 5,984,582 A | * | 11/1999 | Schwert | 138/97 X |
| RE36,859 E | * | 9/2000 | Storah | 138/98 |
| 6,117,507 A | * | 9/2000 | Smith | 138/97 X |
| 6,148,147 A | * | 11/2000 | Durham | 392/465 |
| 6,228,312 B1 | * | 5/2001 | Boyce | 264/36.16 X |

FOREIGN PATENT DOCUMENTS

WO 88/00528 * 1/1988 .................. 156/287

* cited by examiner

Primary Examiner—Thomas B. Will
Assistant Examiner—Jong-Suk Lee
(74) Attorney, Agent, or Firm—Rothwell, Figg, Ernst & Manbeck

(57) ABSTRACT

A method of repairing or reinforcing worn-out underground buried drainpipes by a resin transfer molding process using both flexible tubes and bagging films is disclosed. In the method of this invention, a reinforcement is primarily inserted into a desired position within a target worn-out drainpipe buried underground. The reinforcement consists of a fiber preform internally having a flexible tube, such as a silicon tube, axially extending along the central axis of the preform and wrapped with an adhesive-coated flexible film as a bagging film to provide protection from sewage or underground water. The flexible tube is, thereafter, expanded to bring the fiber preform into close contact with the interior surface of the target drainpipe. The opposite ends of the reinforcement are sealed with two lids. Thereafter, thermosetting resin is transferred into the fiber preform, thus allowing the fiber preform to be impregnated with the thermosetting resin. The impregnated resin is, thereafter, cured to shape the fiber preform as desired, thus repairing and reinforcing the target drainpipe.

8 Claims, 7 Drawing Sheets

METHOD OF REPAIRING OR REINFORCING WORN-OUT UNDERGROUND BURRIED DRAINPIPES BY RESIN TRANSFER MOLDING PROCESS USING BOTH FLEXIBLE TUBES AND BAGGING FILMS

BACKGROUND OF THE INVENTION

1. Field of the Invention

The present invention relates to a method of repairing or reinforcing worn-out underground buried drainpipes through a trenchless rejuvenation technology and, more particularly, to a method of repairing or reinforcing such worn-out underground buried drainpipes by RTM (resin transfer molding) process using both flexible tubes and bagging films, the method being carried out by primarily inserting a reinforcement into a desired position within a target worn-out underground buried drainpipe, the reinforcement consisting of a fiber preform internally having a flexible tube axially extending along the central axis of the preform and externally wrapped with an adhesive-coated flexible bagging film to be protected from sewage or underground water left within the drainpipe, and transferring thermosetting resin to the fiber preform through the flexible tube to impregnate the preform with the resin, and finally curing the impregnated resin in the fiber preform, thus simply and easily repairing or reinforcing such worn-out underground buried drainpipes while reducing the repairing or reinforcing cost in comparison with conventional excavation and trenchless rejuvenation technologies.

2. Description of the Prior Art

As well known to those skilled in the art, at least 40~50% of pipes of drainage systems laid underground have been reduced in their strength, and partially cracked, broken and corroded before a lapse of their expected life span due to careless management, and so they undesirably allow a leakage of sewage into soil to finally contaminate soil and underground water in addition to causing a ground subsidence.

The cracked or broken drainpipes also allow rainwater and underground water to flow into drainpipes through cracks, thereby undesirably increasing the sewage disposal cost. Another problem experienced in the conventional drainage systems is that they force users to pay excessive money and waste excessive labor and time while managing, repairing or replacing the underground buried drainpipes. That is, when it is desired to manage, repair or replace drainpipes laid underground since the pipes are reduced in their strength, partially cracked, broken or corroded before a lapse of their expected life span, it is necessary to excavate earth around target pipes, thus increasing the cost and being very inconvenient to workers while managing, repairing or replacing the pipes.

In many nations, most pipes for drainage systems had been somewhat roughly designed, manufactured and buried underground without carefully considering the dynamic relation between the expected life span of the pipes, the depth of the pipes under the ground surface, and surface load applied to the pipes laid underground. Due to the above-mentioned problem experienced in the design, manufacture and laying of the drainpipes in addition to careless management of the pipes after laying the pipes underground, most drainpipes are regrettably worn-out, reduced in their strength, partially cracked, broken and corroded before a lapse of their expected life span. Such cracked or broken drainpipes undesirably allow a leakage of sewage into soil to finally contaminate soil and underground water in addition to causing a ground subsidence, and also allow underground water and rainwater to flow into the drainpipes, thereby increasing the quantity of sewage and increasing the sewage disposal cost.

When drainpipes are worn-out, reduced in their strength, partially cracked, broken and corroded as described above, earth has to be excavated in a large area around the target pipes using power excavators to allow replacement of the existing pipes with new pipes, while closing a road and regulating the traffic for a lengthy period of time. Furthermore, such a conventional method undesirably results in a breakage of pavements before a lapse of expected life span of the pavements, social and financial burden on the community due to the closing of the road and the regulating of the traffic for a lengthy period of time, and consumption of excessive labor and time for management of drainpipes.

In an effort to overcome such problems experienced due to the excavation of earth while managing or repairing drainage systems, a variety of trenchless rejuvenation technologies have been proposed and preferably used. Such trenchless rejuvenation technologies are particularly advantageous in that it is possible to remarkably save time, labor and money while managing or repairing the drainpipes buried underground. The trenchless rejuvenation technologies are also preferably usable for the management or repair of the pipes of waterworks in addition to the pipes of drainage systems.

Well-known trenchless rejuvenation technologies for underground buried pipes are classified into several types: reverse lining processes, slip lining processes, cured-in-place lining processes (CIPL), close-fit lining processes, spirally wound pipes lining processes and etc. Of such well-known trenchless rejuvenation technologies, a reverse lining process using unwoven fabric tubes impregnated with proper resin, such as polyester, and a spirally wound pipes lining process using thermoplastic resin have been most preferably and widely used.

In the conventional reverse lining process, it is necessary to keep the unwoven fabric tubes impregnated with polyester within a refrigerated container so as to prevent the polyester of the tubes from being cured before a practical use of the tubes at a construction field. Therefore, this process is problematic in that it is necessary to always use refrigerated transport vehicles for the unwoven fabric tubes impregnated with polyester and to use the tubes within a short period of time after the resin impregnation, thus being very inconvenient to workers and increasing the cost of repairing or reinforcing the drainpipes.

On the other hand, the conventional spirally wound pipes lining process using thermoplastic resin is problematic in that it is necessary to use large-sized heaters for melting the thermoplastic resin and additional power devices for forcibly transferring the highly viscous molten resin to a desired position within drainpipes laid underground.

In addition, a resin transfer molding process (RTM) for repairing or reinforcing the pipes without excavating earth has been proposed and used. However, the conventional RTM process is problematic in that underground water or sewage left within existing pipes is naturally and undesirably impregnated into fabric preforms, thus reducing the resin impregnation capability of the preforms and deteriorating the processing effect, and failing to accomplish a desired strength of the repaired or reinforced pipes.

Since the conventional spirally wound pipes lining processes use thermoplastic resin, it is necessary to inject an adhesive agent under pressure into the gap between a target drainpipe and an extruded resin tube or to forcibly expand the extruded resin tube so as to bring the resin tube into close contact with the internal surface of the target drainpipe. However, it is very difficult to perform such a process of bringing the resin tube into close contact with the drainpipe, and so the conventional spirally wound pipes lining processes fail to accomplish desired processing effect or desired strength of repaired or reinforced pipes.

SUMMARY OF THE INVENTION

Accordingly, the present invention has been made keeping in mind the above problems occurring in the prior art, and an object of the present invention is to provide a method of repairing or reinforcing worn-out drainpipes by a resin transfer molding process using both flexible tubes and bagging films, which uses thermosetting resin capable of improving the adhesiveness between reinforcements and worn-out drainpipes without any separate adhesive agent, and which is thus free from any separate process of forcing the resin tubes to come into close contact with the drainpipes, different from the conventional spirally wound pipes lining process and thereby saving time while repairing or reinforcing the worn-out drainpipes, and which does not require any consideration of prevention of resin curing during the process, different from the conventional reverse lining process, thus being free from use of refrigerated transport vehicles and being very convenient to workers, and reducing the cost of repairing or reinforcing the worn-out drainpipes.

In order to accomplish the above object, the present invention provides a method of repairing or reinforcing such worn-out drainpipes by a resin transfer molding process using both flexible tubes and bagging films, which comprises the steps of: inserting a reinforcement into a desired position within a target worn-out drainpipe buried underground, the reinforcement consisting of a fiber preform internally having a flexible tube, such as a silicon tube, axially extending along the central axis of the preform and wrapped with an adhesive-coated flexible film as a bagging film to provide protection from sewage or underground water; expanding the flexible tube to bring the fiber preform into close contact with the interior surface of the target drainpipe; sealing opposite ends of the reinforcement with lids; and transferring thermosetting resin into the fiber preform to impregnate the preform with the thermosetting resin, and finally curing the impregnated resin in the fiber preform.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
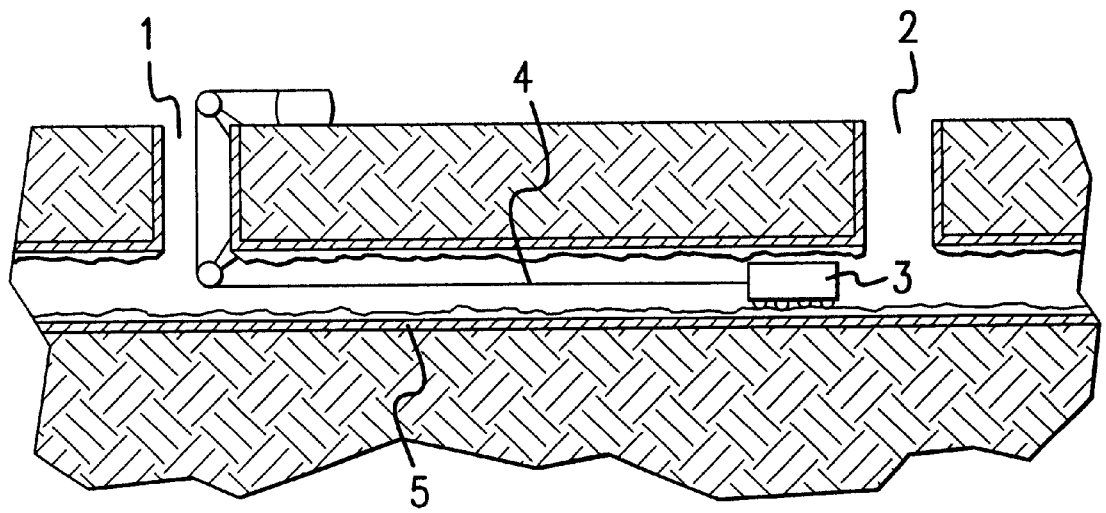
FIGS. 1 to 5 are views, showing the process of repairing or reinforcing worn-out drainpipe in accordance with the preferred embodiment of this invention.

The process of repairing or reinforcing worn-out underground buried drainpipe in accordance with the preferred embodiment of this invention comprises the first to fourth steps as follows:

Step 1:

As shown in FIG. 1, the interior of a target drainpipe 5 is cleaned using a mobile robot 3. After the robot 3 is recovered from the cleaning process, a rope 4 having a predetermined length is connected to the robot 3 prior to inserting the robot 3 into the pipe 5 through one manhole 1. The robot 3 moves along the pipe 5 while dragging the rope 4 prior to being recovered from the pipe 5 through another manhole 2, and so it is possible to array the rope 4 along the pipe 5 with both ends of the rope 4 being positioned outside of the two manholes 1 and 2.

Figure 2:
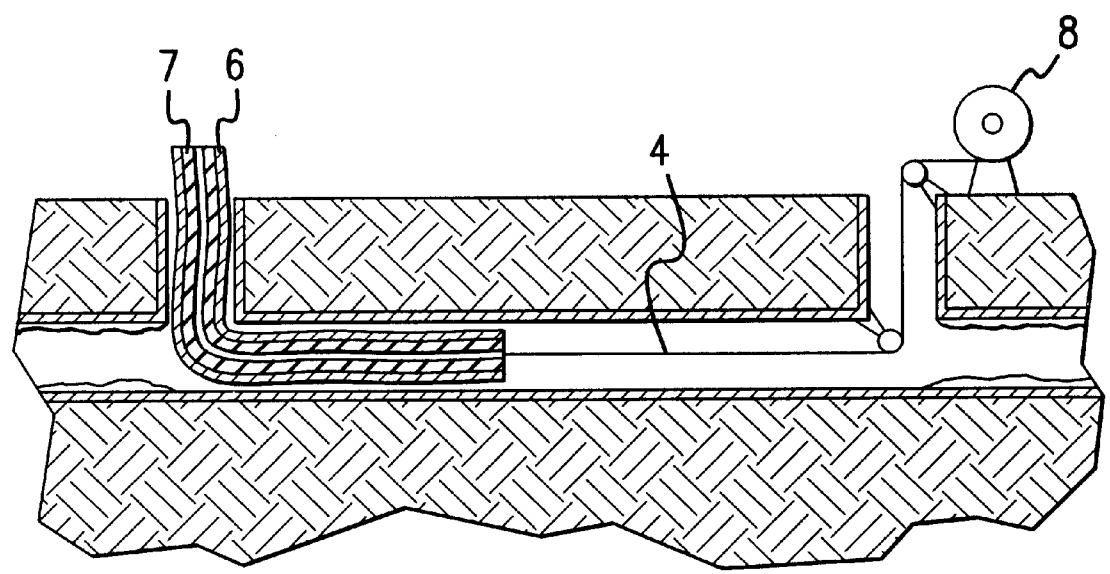
Figure 6:
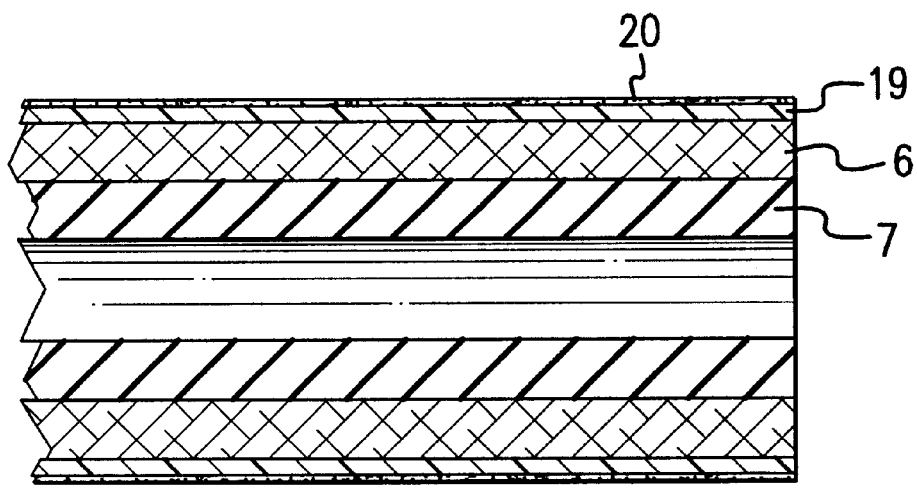
FIG. 6 is a sectional view, showing the construction of a reinforcement used in the process of this invention.

Thereafter, a flexible tube 7 wrapped with a fiber preform 6 is connected to one end of the rope 4 as shown in FIG. 2. In such a case, the fiber preform 6 is wrapped with a flexible film 19 as a bagging film as shown in FIG. 6, with an adhesive agent 20 coated on the surface of the flexible film 19 at which the film 19 comes into contact with the drainpipe 5.

Thereafter, the flexible tube 7 is pulled using a winding machine 8, and so the tube 7 is arrayed within the pipe 5. In such a case, the flexible film 19 prevents the fiber preform 6 from being scratched or damaged by the internal surface of the pipe 5 when the flexible tube 7 together with the preform 6 is dragged within the pipe 5. Therefore, the fiber preform 6 is prevented from being undesirably impregnated with underground water or sewage left within the pipe 5, and so the preform 6 is free from an undesired reduction in its resin impregnation capability during the process. In addition, when the adhesive agent 20 coated on the flexible film 19 is properly controlled in its viscosity, it is possible to collaterally use the adhesive agent 20 as a lubricant for allowing the film 19 to smoothly move within the pipe 5 without being damaged due to frictional contact with the pipe 5.

Figure 3:
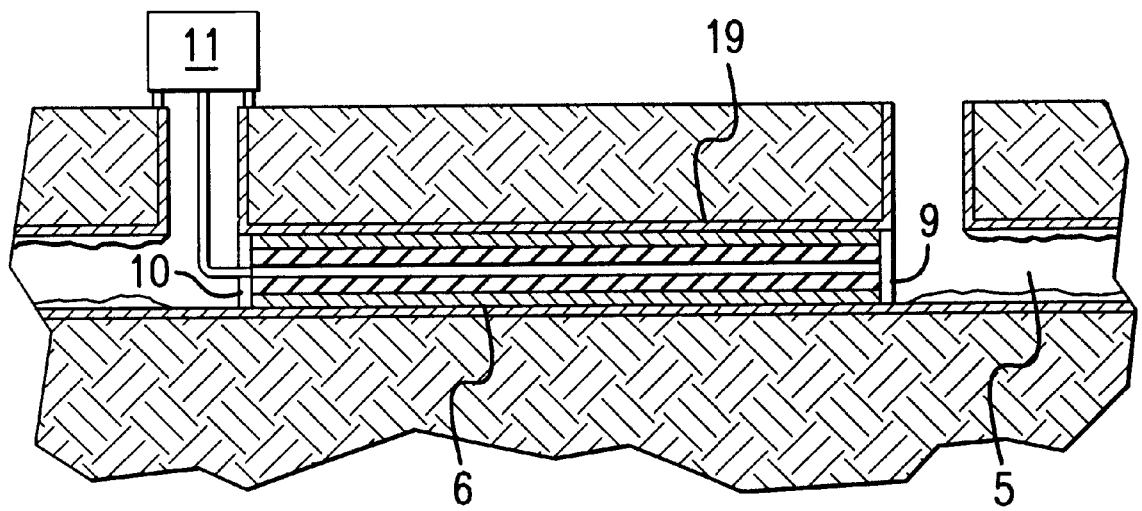
Figure 4:
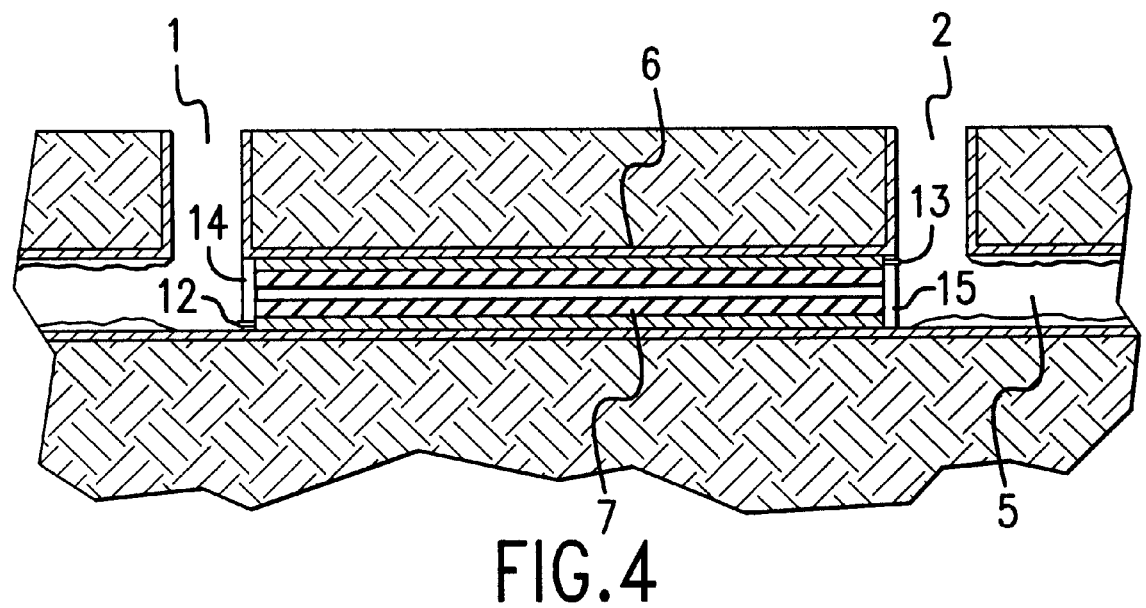

Step 2:

One end 9 of the flexible tube 7 is closed, while the other end 10 is connected to a heater compressor or a heater pump 11 as shown in FIG. 3. Thereafter, hot air or hot water under pressure is supplied from the compressor or the pump 11 into the tube 7, thus expanding the tube 7. Due to the supply of hot air or hot water into the flexible tube 7, the binder within the fiber preform 6 is melted by applying heat and hardened by cooling, thus forming a desired shape of the preform 6 corresponding to that of the pipe 5. In addition, the flexible film 19 wrapping the fiber preform 6 is heated and expands to be brought into close contact with the internal surface of the pipe 5. The adhesive agent 20 in such a case fixes the flexible film 19 to the internal surface of the pipe 5.

When the fiber preform 6 is made of a material capable of allowing the preform 6 to maintain its desired shape and to come into close contact with the pipe 5 without being undesirably changed in its shape due to resin pressure during the process, it is possible to produce the fiber preform 6 without adding a binder.

Step 3:

After the step 2, opposite ends of the flexible tube 7 wrapped with the fiber preform 6 are closed by two lids 14 and 15. In such a case, the first lid 14 is provided with a gate 12, while the second lid 15 is provided with an air vent 13.

When the inner diameter of the target drainpipe 5 is smaller than the diameter of the manholes 1 and 2, it is possible to produce each of the two lids 14 and 15 as a single body. However, when the inner diameter of the target drainpipe 5 is not smaller than the diameter of the manholes 1 and 2, it is necessary to produce each of the two lids 14 and 15 as divided pieces to allow the lids 14 and 15 to be inserted into the pipe 5 through the manholes 1 and 2.

Figure 7:
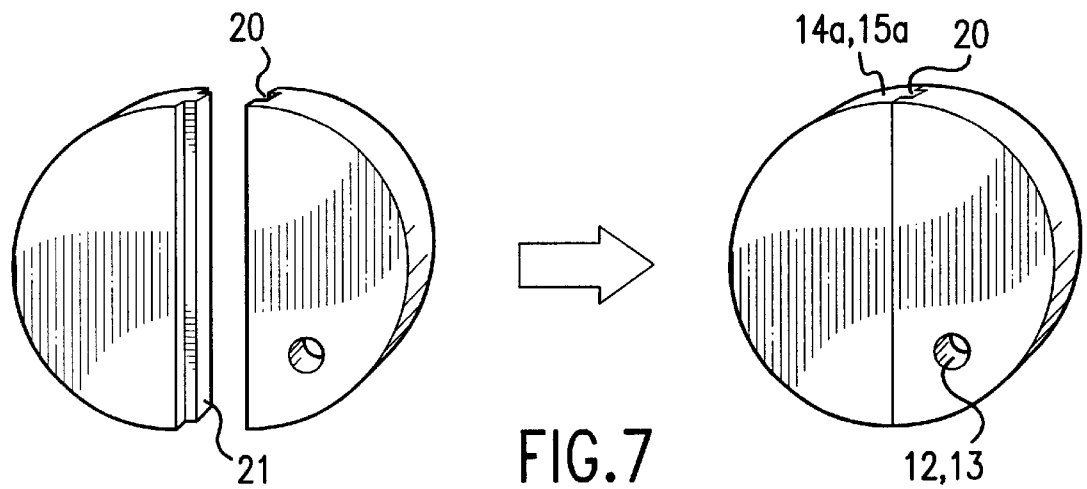
FIGS. 7 to 9 are views, showing the construction of lids having different structures according to different embodiments of this invention and used for closing opposite ends of a reinforcement having a flexible tube in the process of this invention.
Figure 8:
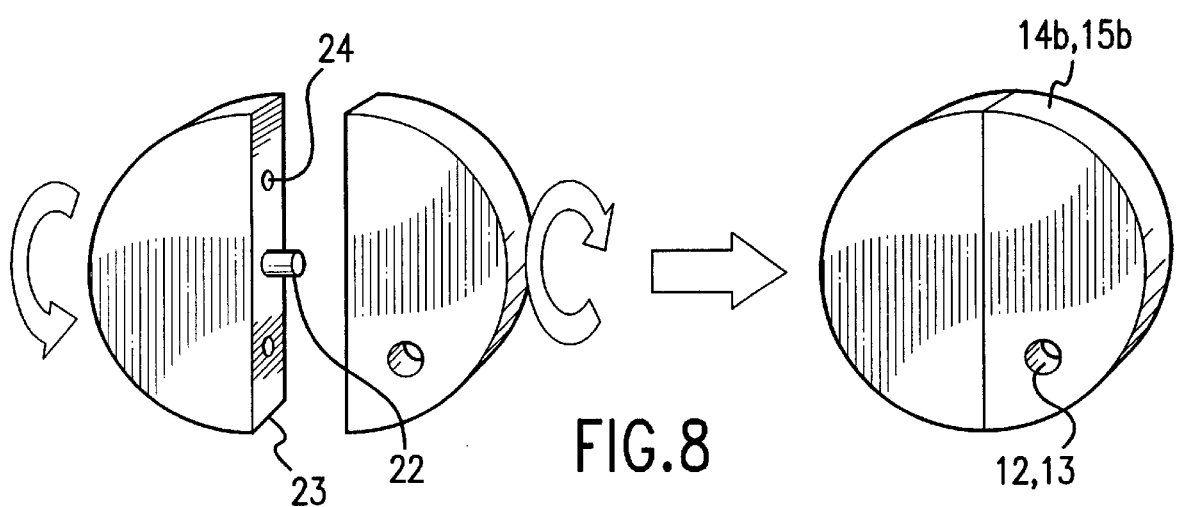
Figure 9:
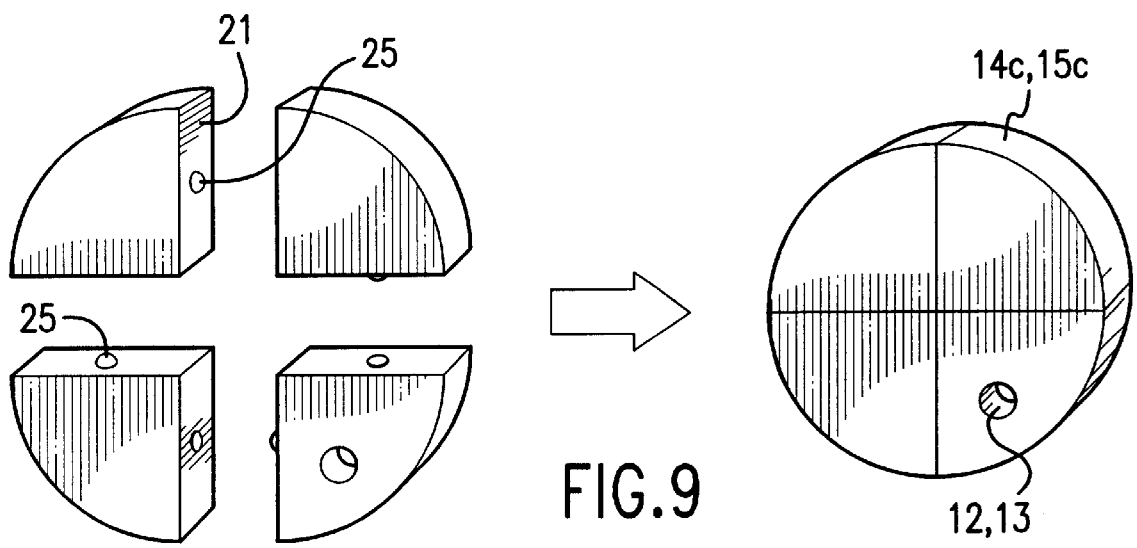

FIGS. 7 to 9 are views, showing the lids 14 and 15 having different structures according to different embodiments of this invention.

In the embodiment of FIG. 7, each of the disc-shaped lids 14a and 15a is divided into two semicircular pieces, with a dovetail rail formed along the central axis of the linear locking surface of one of the two pieces and a dovetail groove 20 formed along the central axis of the linear locking surface of the other piece. When it is desired to assemble the two pieces into a single lid 14a or 15a, the dovetail rail is fitted into the dovetail groove 20. Before assembling these two pieces, a conventional O-ring (sealing material) 21 is applied to the junction of the two pieces so as to accomplish a desired sealing effect at the junction. When the size of the lids 14a and 15a is substantially larger than that of the manholes 1 and 2, each of the lids 14a and 15a may be divided into three or more pieces.

In the embodiment of FIG. 8, each of the disc-shaped lids 14b and 15b is divided into two semicircular pieces, with an externally-threaded bolt 22 provided at the center of the linear locking surface of one of the two pieces and an internally-threaded hole formed at the center of the linear locking surface of the other piece. When it is desired to assemble the two pieces into a single lid 14b or 15b, the bolt 22 is tightened to the internally-threaded hole. Before the assembly, a rubber coated film (sealing material) 23 is applied to the junction of the two pieces so as to accomplish a desired sealing effect at the junction. In such a case, two snap balls 24 are preferably formed on the locking surface of one of the two pieces, while two rounded depressions are formed on the locking surface of the other piece at positions corresponding to the two snap balls 24, thus accomplishing a precise alignment of the two locking surfaces. In this embodiment, each of the lids 14b and 15b may be divided into three or more pieces when the size of the lids 14b and 15b is substantially larger than that of the manholes 1 and 2 in the same manner as that described for the embodiment of FIG. 7.

In the embodiment of FIG. 9, each of the disc-shaped lids 14c and 15c is divided into four pieces, with a snap fastener 25 provided at the locking surface of each of the four pieces. When it is desired to assemble the four pieces into a single lid 14c or 15c, the four pieces are locked to each other by the snap fasteners 25. Before the assembly, a conventional O-ring (sealing material) 21 is applied to the junction of the four pieces so as to accomplish a desired sealing effect at the junction.

Figure 5:
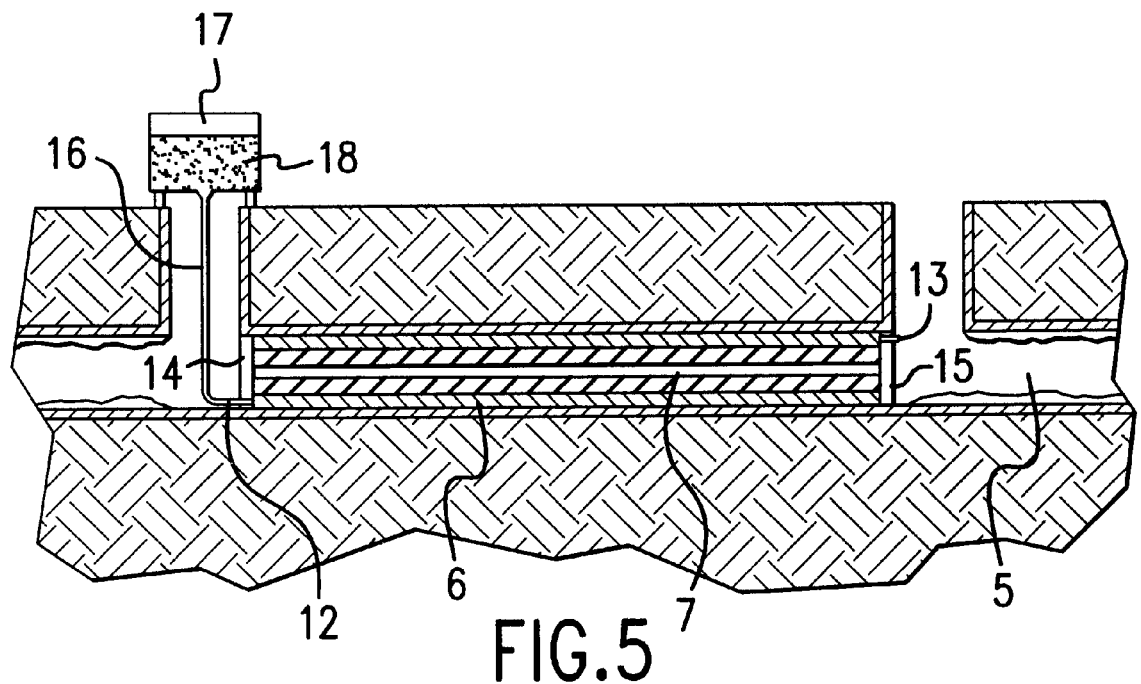

Step 4:

As shown in FIG. 5, a resin supply device 17 is connected to the gate 12 of the first lid 14 through a resin-feeding pipe 16, and feeds thermosetting resin 18 to the fiber preform 6.

In such a case, the thermosetting resin 18 is a monomer having a low viscosity, and so it is possible to smoothly feed the resin 18 to the preform 6 with less power. The thermosetting resin 18 is impregnated into the fiber preform 6, thus repairing and reinforcing the cracked or damaged portion of the pipe 5. In such a case, air existed in the void of the fiber perform is expelled to the atmosphere through the air vent 13 of the second lid 15.

After the thermosetting resin 18 impregnated in the fiber preform 6 is completely cured, the flexible tube 7 is removed from the fiber preform 6 to complete the process.

In the present invention, the flexible tube 7 is covered with Teflon or a release agent, and so it is possible to easily remove the tube 7 from the fiber preform 6 after the process. It is also possible to leave the flexible tube 7 within the preform 6 after the process. In such a case, the flexible tube 7 accomplishes a coating effect of the internal surface of the preform 6.

When it is desired to repair or reinforce a long drainpipe 5, it is necessary to use a long tube 7. In such a case, the flexible tube 7 is heavy, and so it is somewhat difficult to set the tube 7 within the fiber preform 6 or to remove the tube 7 from the preform 6 after the process. In such a case, it is preferred to use a thin and flexible plastic film, such as a polyethylene film, in place of the flexible tube 7 so as to overcome the above-mentioned problem experienced in using the long tube 7.

It is also necessary to design the lids 14 and 15 to effectively resist a high pressure of about 1.0 MPa during an injection of the highly pressurized thermosetting resin 18 into the fiber preform 6.

Figure 10:
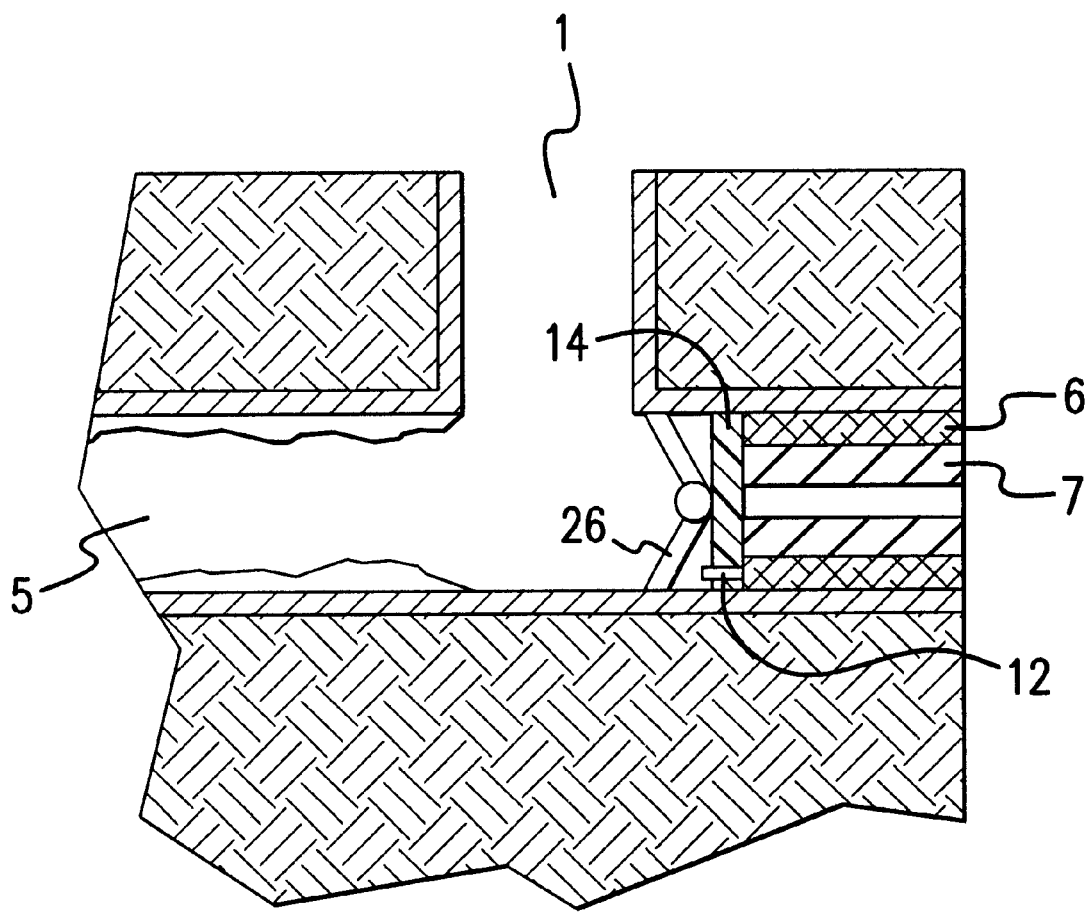
FIGS. 10 and 11 are views, showing lid clamping structures in accordance with different embodiments of the present invention, the structures being used for holding the lids in their correct positions in the case of an injection of highly pressurized thermosetting resin into the fiber preform.
Figure 11:
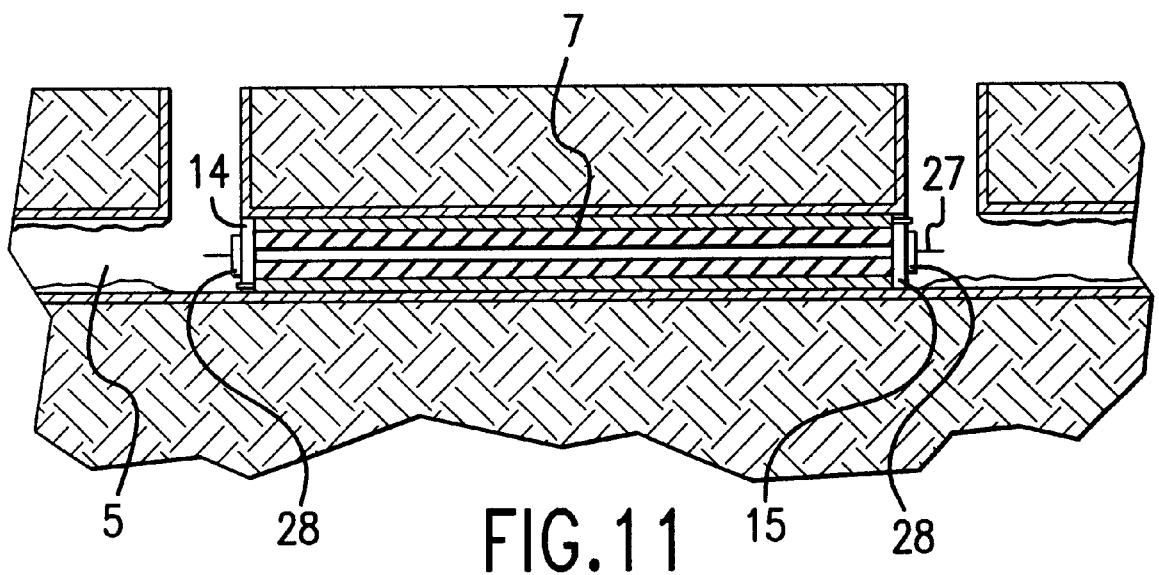
Figure 12:
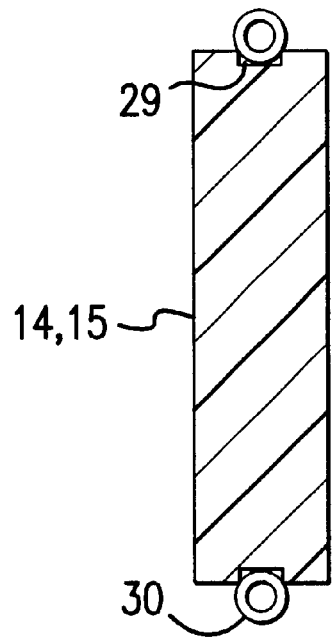
FIG. 12 is a sectional view, showing a lid sealing structure in accordance with an embodiment of the present invention.

In order to accomplish the above object, a lid clamping structure is used for holding the lids 14 and 15 in their correct positions in the case of an injection of the highly pressurized thermosetting resin 18 into the fiber preform 6 as shown in FIGS. 10 and 11. In the embodiment of FIG. 10, a wedge 26 is used for holding each of the lids 14 and 15 in its correct position. In the embodiment of FIG. 11, a steel wire 27 extends between the two lids 14 and 15 while passing through the flexible tube 7 prior to being fully tightened by nuts 28 at its opposite ends outside the lids 14 and 15, thus holding the positions of the two lids 14 and 15.

In addition, it is necessary to seal the gap between the internal surface of the drainpipe 5 and the outside edges of the lids 14 and 15 so as to prevent an undesired leakage of air or resin through the gap. In the preferred embodiment of the present invention, a groove 29 is formed along the circumferential surface of each lid 14 or 15, with an annular expansible tube 30 fitted over the circumferential groove 29 of each lid 14 or 15. In such a case, the tube 30 is made of a flexible material and can be inflated with air or liquid to seal the gap between the pipe 5 and each lid 14 or 15. Of course, it should be understood that a conventional O-ring may be used in place of the annular tube 30 without affecting the function of this invention.

After the injection of the thermosetting resin 18 into the fiber preform 6, the step 2 is performed again to expand the flexible tube 7 to pressurize the impregnated resin within the preform 6. In such a case, it is possible to increase the fiber volume fraction of the resin impregnated fiber perform and to remove air bubbles from the resin impregnated fiber preform.

As described above, the present invention provides a method of repairing or reinforcing worn-out underground buried drainpipes by a resin transfer molding process using both flexible tubes and bagging films. This method uses thermosetting resin capable of improving the adhesiveness between reinforcements and worn-out drainpipes without requiring an application of any separate adhesive agent. The method thus saves time while repairing or reinforcing worn-out underground buried drainpipes. This method is also very convenient to workers, and reduces the cost of repairing or reinforcing worn-out underground buried drainpipes in comparison with conventional excavation and trenchless rejuvenation technologies. It is also possible to use the method of this invention for repairing or reinforcing worn-out pipes of waterworks when harmless resin is used as the thermosetting resin during the process.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of repairing or reinforcing worn-out underground buried drainpipes by a resin transfer molding process using both flexible tubes and bagging films, comprising the steps of:

inserting a reinforcement into a desired position within a target worn-out drainpipe buried underground, said reinforcement consisting of a fiber preform internally having a flexible tube axially extending along a central axis of said preform and wrapped with an adhesive-coated flexible film as a bagging film to provide protection from sewage or underground water left within the target drainpipe;

expanding said flexible tube to bring the fiber preform into close contact with an interior surface of said target drainpipe;

sealing each end of said reinforcement with a lid; and transferring thermosetting resin into the fiber preform to impregnate said preform with the thermosetting resin prior to curing said thermosetting resin, thus repairing or reinforcing the target drainpipe.

2. The method according to claim 1, wherein a viscosity controllable adhesive agent is coated on an external surface of said flexible film to allow said film to smoothly move within the drainpipe without being damaged due to frictional contact with said drainpipe.

3. The method according to claim 1, wherein each of said lids is divided into two or more pieces when an inner diameter of the target drainpipe is not smaller than a diameter of a manhole.

4. The method according to claim 3, wherein said pieces of each of the lids are locked together into a single body using a dovetail engaging structure at their locking surfaces, with a sealing material applied to the locking surfaces of said pieces so as to accomplish a desired sealing effect at said locking surfaces.

5. The method according to claim 3, wherein said pieces of each of the lids are locked together into a single body using an externally-threaded bolt and an internally-threaded hole at their locking surfaces, with a snap ball formed on the locking surfaces of said pieces to accomplish a precise alignment of the locking surfaces and a sealing material applied to the locking surfaces so as to accomplish a desired sealing effect at said locking surfaces.

6. The method according to claim 1, wherein a wedge is installed outside each of said lids so as to hold each of the lids in its correct position during an injection of the thermosetting resin under pressure into the fiber preform.

7. The method according to claim 1, wherein a steel wire extends between said lids while passing through the flexible tube prior to being tightened by nuts at its opposite ends outside of the lids, thus holding the lids in their correct positions during an injection of the thermosetting resin under pressure into the fiber preform.

8. The method according to claim 1, wherein a groove is formed along a circumferential surface of each of the lids, with an annular tube fitted over the groove of each of the lids to seal a gap between the internal surface of the drainpipe and an outside edge of each of the lids.

* * * * *